(12) United States Patent
Stark

(10) Patent No.: US 11,106,634 B1
(45) Date of Patent: Aug. 31, 2021

(54) SYSTEMS AND METHODS FOR RANDOMIZED FILE SEGMENTATION AND STORAGE

(71) Applicant: Stark Industries, Inc., Clarksville, TN (US)

(72) Inventor: Atlas Tony Stark, Clarksville, TN (US)

(73) Assignee: STARK INDUSTRIES, INC., Clarksville, TN (US)

( * ) Notice: Subject to any disclaimer, the term of this patent is extended or adjusted under 35 U.S.C. 154(b) by 0 days.

(21) Appl. No.: 17/141,803

(22) Filed: Jan. 5, 2021

(51) Int. Cl.
*G06F 16/00* (2019.01)
*G06F 16/176* (2019.01)
*G06F 16/182* (2019.01)
*H04L 29/06* (2006.01)

(52) U.S. Cl.
CPC ......... *G06F 16/176* (2019.01); *G06F 16/182* (2019.01); *H04L 63/083* (2013.01)

(58) Field of Classification Search
None
See application file for complete search history.

(56) References Cited

U.S. PATENT DOCUMENTS

| | | | |
|---|---|---|---|
| 2001/0034812 A1* | 10/2001 | Ignatius | G06F 3/0605 711/112 |
| 2006/0101084 A1* | 5/2006 | Kishi | G06F 3/0686 |
| 2006/0288048 A1* | 12/2006 | Kamohara | G06F 16/119 |
| 2015/0310219 A1* | 10/2015 | Haager | H04L 9/0894 713/165 |

* cited by examiner

*Primary Examiner* — Thu Nguyet T Le
(74) *Attorney, Agent, or Firm* — Eversheds Sutherland (US) LLP

(57) ABSTRACT

Systems, methods, and computer-readable media are disclosed for randomized file segmentation and storage. Example methods may include separating, by a system comprising a plurality of servers, a data file into a plurality of file fragments, sending a first file fragment to a first randomly selected server of the plurality of servers, determining a first token having a random expiration time, causing the first token to be stored at the first randomly selected server in association with the first file fragment, sending a second file fragment to a second randomly selected server of the plurality of servers, determining a second token having a random expiration time, and causing the second token to be stored at the second randomly selected server in association with the second file fragment.

20 Claims, 6 Drawing Sheets

SYSTEMS AND METHODS FOR RANDOMIZED FILE SEGMENTATION AND STORAGE

BACKGROUND

The importance of data security and protection has grown dramatically in recent years and continues to expand further. For example, the complexity and frequency of attacks on corporations have increased. Damage to infrastructure by the attacks (e.g., data loss, data corruption, compromised assets, data theft, and/or loss of funds or resource) may negatively impact financial systems, grids, healthcare, transportation, governments, businesses, and other entities. Effectively protecting data and improving data management may therefore be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
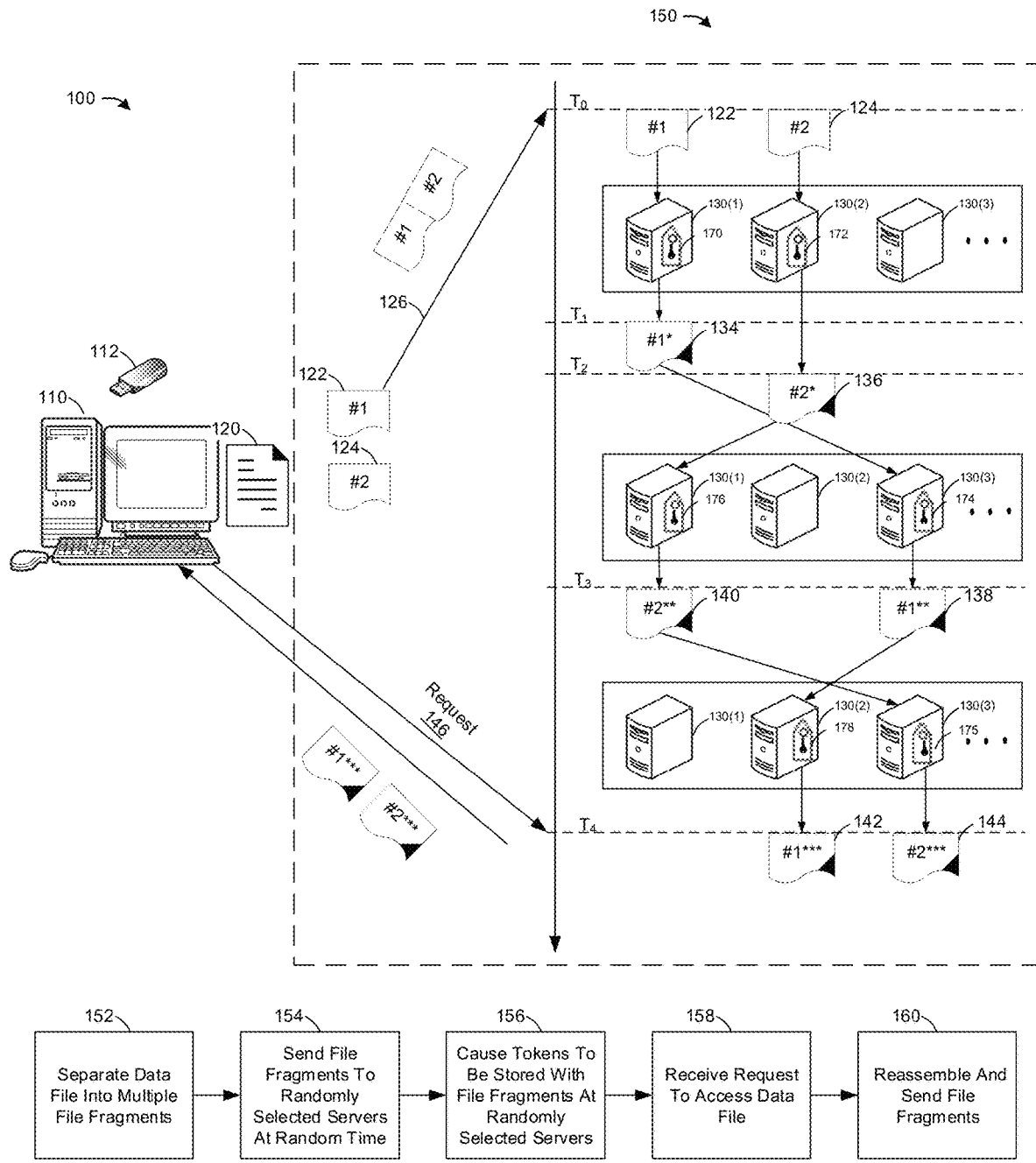
FIG. 1 is a schematic diagram of an example use case illustrating randomized file segmentation and storage in accordance with one or more example embodiments of the disclosure.

This disclosure relates to, among other things, systems, methods, computer-readable media, techniques, and methodologies for data (e.g., documents, files, messages, or the like) splitting and protection to improve data security and reduce cybersecurity risks using based on a data management system. A data management system may make data impossible to penetrate because the data management makes all data an array of moving targets, constantly in motion, all of the time. For example, the data management system may break data into several data fragments, and put the several data fragments in motion across multiple pathways. The data management system may reassemble the data fragments when the data management system receives a request from a secured person through a secured system.

In some embodiments, the data management system may encrypt the data fragments by assigning a specific token identifier to each data fragment before sending the data fragments to multiple servers. A token identifier may be referred to a series of numbers, letters, characters, symbols, and/or a combination thereof that may represent a data fragment. For example, the data management system may generate a unique token identifier for each data fragment, and assign the generated token identifier to each data fragment. After encrypting the data fragments, the data management system may send the data fragments to multiple servers that are included in the data management system, e.g., via a private network. Each of the multiple servers may be an encrypted private server that generates a unique token to a received data fragment. Each data fragment may be rotated in a random pattern among each of the multiple servers in constant motion. For example, each data fragment may be transferred from one server of the multiple servers to the next server of the multiple servers randomly. A server that receives a data fragment may generate a unique token and assign the unique token to the received data fragment. Every time each data fragment may go to a different server, and a different token will be assigned to the received data fragment. As a data fragment passes from one server to another server and a token assigned to that data fragment is changed, the same token is never used more than once. All of the data fragments will rotate among servers but never reside on the same server at one time. Each time a data fragment gets routed to a new server, the data fragment will be re-encrypted with a new unique token. If the data management receives a request from an authorized device (e.g., a device which a physical key plugs into, the device being in a physical location where the main terminal is installed, the physical key being in the hands of a trusted individual), the data management system may retrieve the data fragments and reassemble the retrieved data fragments.

In some embodiments, examples of data may include emails, photos, medical data, personal financial information, credit card transactions, file downloads, file uploads, audio, video, photos, software code, secret formulas, bank account numbers, routing numbers, names and addresses, insurance policies, tax returns, top-secret military intel and plans, and/or any other related forms of data.

In the data management system, data may be broken into data fragments, and transferred from one server to another server constantly with a changing token. Further, a physical key may be needed to reassemble the data into meaningful information. As such, the data management system may be impenetrable by attackers. For example, attackers attempting to steal data may only get a data fragment of that data, even if the attackers could get through the high level of encryption on that single data fragment. Further, even if the attackers could penetrate every server and steal all of the data fragments, the attackers are not able to reassemble the data without the physical key that is a physical item in the hands of a trusted individual. The attackers would have to be physically present in a locked down server room in possession of the physical key to all of the data fragments on a single authorized workstation in order to steal the data, which will be very difficult.

Referring to FIG. 1, a schematic diagram of example an use case illustrating randomized file segmentation and storage in accordance with one or more example embodiments of the disclosure. A physical key 112 (e.g., a Vernam cipher, a USB security key, or the like) may be plugged into a computer device 110 to make the computer device 110 an approved computer. The physical key 112 may be in the hands of an authorized individual. The computer device 110 may be located in an authorized physical location (e.g., a secure location of a corporation, the government, or the like). The computer device 110 may include a data file 120. If the physical key 112 is plugged into the computer device 110, the computer device 110 may send the data file 120 to a data management system 100 including a randomized file segmentation and storage subsystem 150 for randomized file segmentation and storage. For example, the data management system may perform one or more operations.

At an operation 152, the data management system 100 may separate a data file into multiple file fragments. As shown in FIG. 1, the data file 120 may be separated into a first file fragment 122 and a second file fragment 124. In some embodiments (not shown in FIG. 1), the data file 120 may be separated into more than two file fragments. In some embodiments (not shown in FIG. 1), the first and second file fragments 122 and 124 may be encrypted. For example, a unique token may be assigned to each of the first and second file fragments 122 and 124, such as the unique token may be attached to a corresponding file fragment. Examples are described in FIG. 3. In some embodiments, the data file 120 may be randomly split into multiple file fragments. The number of the multiple file fragments is random. Each of multiple file fragments are different in size. For example, the data file 120 may be 200 MB (Megabit) in size. The data file 120 may be randomly split into 9 file fragments, instead of each file fragment being 0.045 in size, each file fragment may differ in size, and may still equal 200 MB when added together with the addition of a byte or two.

At an operation 154, the data management system 100 may send the file fragments to randomly selected servers at a random time. For example, the first and second file fragments 122 and 124 are sent to multiple servers 130 at a time period $T_0$. As illustrated, the first file fragment 122 is sent to the server 130(1), and the second file fragment 124 is sent to the server 130(2). The server 130(1) is randomly selected for the first file fragment 122, and the server 130(2) is randomly selected for the second file fragment 124. In some embodiments (not shown in FIG. 1), the first file fragment 122 may be sent to other servers rather than the server 130(1) Similarly, the second file fragment 124 may be sent to other servers rather than the server 130(2). In some embodiments, servers may individually generate unique tokens upon recipients of file fragments. For example, the server 130(1) may generate a first token 170 having a first random expiration time $T_1$, and the server 130(2) may a second token 172 having a second random expiration time $T_2$. The server 130(1) may assign the first token 170 to the first file fragment 122 to generate the first encrypted file fragment 134. The server 130(2) may assign the second token 172 to the second file fragment 130 generate the second encrypted file fragment 136. In some embodiments, the newly generated token may replace the previously generated token. Taking the file fragment 122 as an example, the first token 170 may replace the token (not shown in FIG. 1) generated prior to sending the file fragment 122 to the servers 124. In some embodiments, the newly generated token may be combined with the previously generated token, such as merging those tokens, or accumulating those tokens.

At an operation 156, the data management system 100 may cause tokens to be stored with the file fragments at the randomly selected servers. For example, the server 130(1) may store the first token 170 in a database (not shown in FIG. 1) of the server 130(1). Examples are described in FIG. 2.

In some embodiments, random expiration times for tokens may be the same or different. If a token is expired (e.g., the token is up to its random expiration time), a corresponding file fragment will move from the current server to another randomly selected server. As shown in FIG. 1, the first random expiration time $T_1$ may be different than the second random expiration time $T_2$. After the first token 170 is expired at $T_1$, the first encrypted file fragment 134 is sent to the server 130(3). The server 130(3) may generate a third token 174 having a third random expiration time $T_3$ and assign the third token 174 to the first encrypted file fragment 134 to generate the third encrypted file fragment 138. After the second token 172 is expired at $T_2$, the second encrypted file fragment 136 is sent to the server 130(1). The server 130(1) may generate a fourth token 176 having a fourth random expiration time that may be equal to $T_3$. Alternatively (not shown in FIG. 1), the fourth random expiration time may be different than $T_3$. The server 130(1) may assign the fourth token 176 to the second encrypted file fragment 136 to generate the fourth encrypted file fragment 140. In some embodiments, each time a unique token is assigned to a file fragment. For example, with respect to the first file fragment 122, the third token 174 may be different than the first token 170. The third token 174 may replace the first token 170 or may be combined with the first token 170. Similarly, the fourth token 176 may be different than the second token 172. The fourth token 176 may replace the second token 172 or may be combined with the second token 172. In some embodiments, the same server may assign a unique token to a different file fragment. For example, the server 130(1) has previously generated the first token 170 for the first file fragment 122, but has not generated any tokens for the second file fragment 124 and/or encrypted file fragments of the second file fragment 124. The fourth token 176 is unique, e.g., is further different than the first token 170. After the third and fourth tokens 174 and 176 are expired at $T_3$, the server 130(3) may send the third encrypted file fragment 138 to the server 130(2), or any other servers rather than the servers 130(1) and 130(3) to make sure that the file fragment 122 moves among the servers 130 but never resides on the same server at one time. Similarly, the server 130(1) may send the fourth encrypted file fragment 140 to the server 130(3), or any other servers rather than the servers 130(1) and 130(2). The fifth and sixth encrypted file fragments 142 and 144 may be generated using the fifth and sixth tokens 175 and 178 that may be generated using similar process to the third and fourth tokens 174 and 176.

At an operation 158, the data management system 100 may receive a request to access the data file. For example, the computer device 110 may send a request 146 to the data management system 100 at a time period $T_4$. The data management system 100 may determine that the request 146 is associated with an approved computer device. For example, the data management system 100 may receive a signal from the physical key 112 that is coupled to the computer device 110.

At an operation 160, the data management system 100 may reassemble and send the file fragments. In some embodiments, the data management system 100 may determine a current server storage location of encrypted file fragments of the first and second file fragments 122 and 124. For example, based on the timestamp $T_4$ associated with the request 146, the data management system 100 may determine that the fifth and sixth encrypted file fragments 142 and 144 are located at the servers 130(2), and 130(3), respectively. The data management system 100 may reassemble the fifth and sixth encrypted file fragments 142 and 144 to form the data file 120. For example, the data management system 100 may decrypt the fifth and sixth encrypted file fragments 142 and 144 to obtain the first and second file fragments 122 and 124 based on the fifth and sixth tokens 175 and 178, and then may combine the first and second file fragments 122 and 124 to form the data file 120. The data management system 100 may send the data file 120 to the computer device 110.

In some embodiments, the data management system 100 may determine that the physical key is removed from the computer device 110. For example, the data management system 100 may not detect the signal from the physical key. As another example, the data management system 100 may receive the signal from the physical key, and may determine that the signal is located at a place that is not authorized. The data management system 100 may revoke the access to the data file. The data management system 100 may repeat the operations 152 to 156.

In some embodiments (not shown in FIG. 1), the data management system 100 may provide the access to the data file 120 to remote devices, and/or virtual machines. For example, the remote devices and/or virtual machines may send a request via a virtual private network (VPN) gateway to the data management system 100. The VPN gateway may be used for remote access to an authorized network (e.g., an internal company network). The data management system 100 may send the requested file fragments to the remote devices and/or virtual machines. Examples are shown in FIGS. 2 and 3.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 2:
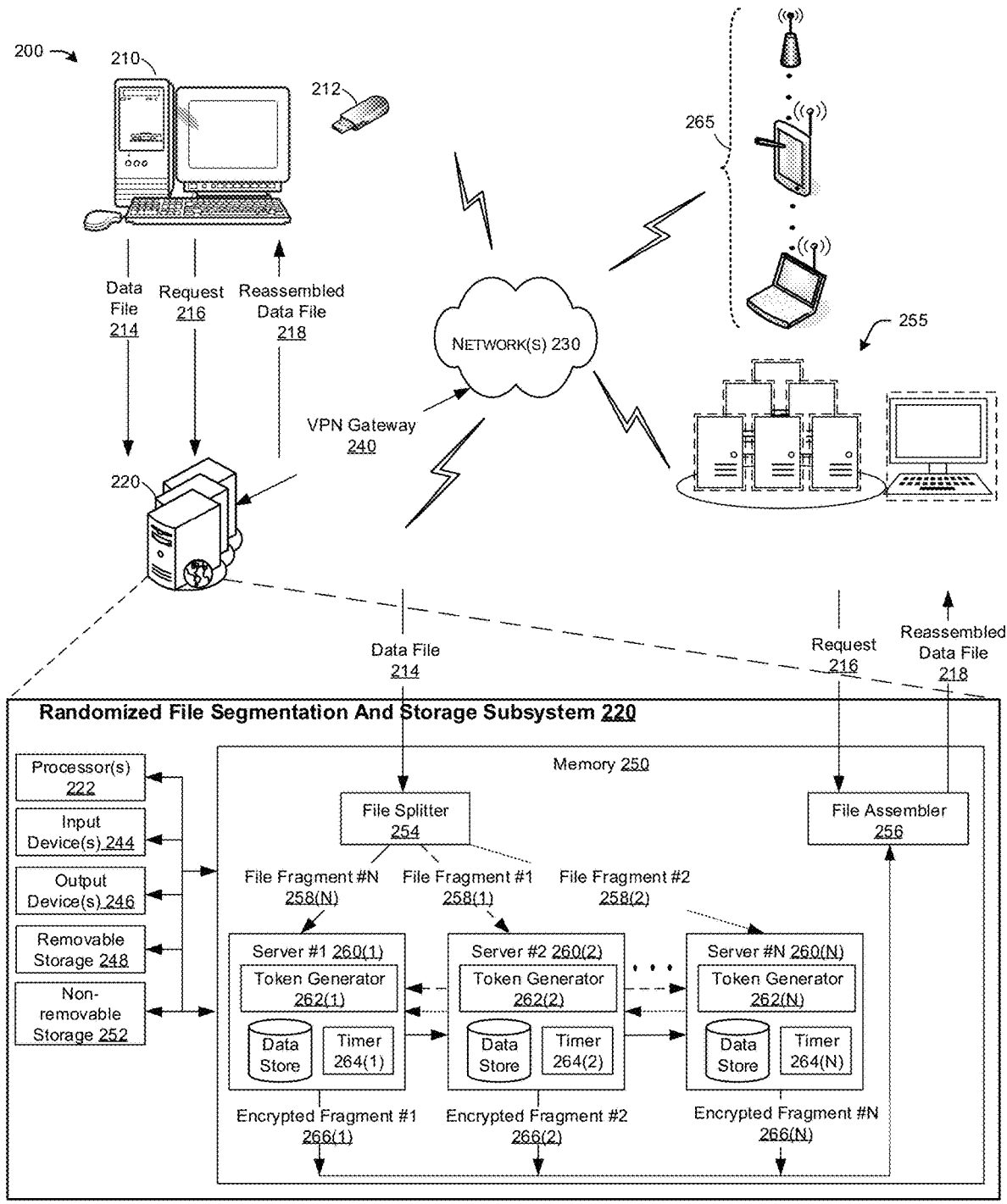
FIG. 2 is a schematic illustration of an example data management system for randomized file segmentation and storage in accordance with one or more example embodiments of the disclosure.
Figure 3:
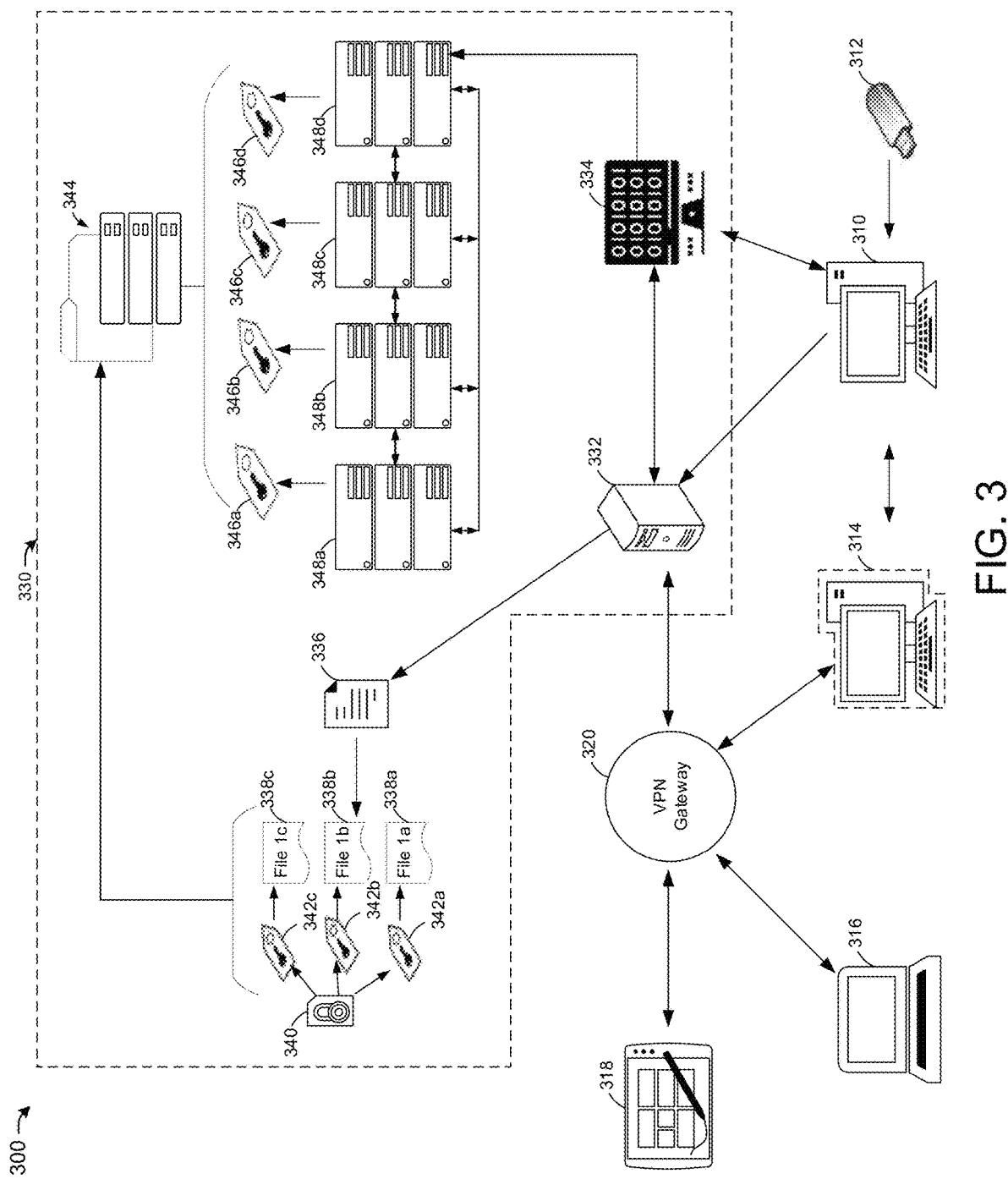
FIG. 3 is a schematic illustration of an example data management system in accordance with one or more example embodiments of the disclosure.

FIG. 2 is a schematic illustration of example data management system 200 for randomized file segmentation and storage in accordance with one or more example embodiments of the disclosure.

As shown in FIG. 2, the data management system 200 may include a computer device 210 (e.g., the computer device 110 of FIG. 1), a physical key 212 (e.g., the physical key 112 of FIG. 1), a randomized file segmentation and storage subsystem 220, one or more virtual machines 255, and one or more remote computing devices 265.

The computer device 210 may be any type of computing devices, such as, but not limited to, mobile, desktop, and/or cloud computing devices, such as servers. In some examples, the computer device 210 may be in communication with the randomized file segmentation and storage subsystem 220, one or more virtual machines 255, and one or more remote computing devices 265 via a network 230, and/or one or more private network connections (e.g., a VPN gateway 240 or the like). When the physical key 212 is plugged into the computer device 210, the computer device 210 may become an approved or authorized computer device.

The one or more virtual machines 255 may describe one or more compute resources that use software instead of a physical computer, server and/or data center (e.g., multiple physical computers or servers) to run programs and deploy applications. The one or more virtual machines 255 may interface with the authorized computer device 210. The one or more virtual machines 255 may access the remote device 260 or allow the remote devices 265 to access via the VPN gateway 240, and/or networks 230.

The one or more remote devices 265 may be any type of computing devices including, but not limited to, desktop personal computers (PCs), laptop PCs, mobile phones, smartphones, personal digital assistants (PDAs), tablet PCs, game consoles, set-top boxes, wearable computers, e-readers, web-enabled TVs, cloud-enabled devices and work stations, and the like. In certain aspects, the computing devices 265 may include touch screen capabilities, motion tracking capabilities, cameras, microphones, vision tracking, etc.

In some embodiments, communications among the computer device 210, the randomized file segmentation and storage subsystem 220, the one or more virtual machines and the one or more remote devices 265 may be via one or more networks 230 and/or the VPN gateway wirelessly or wired. The one or more networks 230 may include, but not limited to, any one of a combination of different types of suitable communications networks such as, for example, broadcasting networks, cable networks, public networks (e.g., the Internet), private networks (e.g., the VPN gateway 240), wireless networks, cellular networks, or any other suitable private and/or public networks. Further, the one or more networks may have any suitable communication range associated therewith and may include, for example, global networks (e.g., the Internet), metropolitan area networks (MANs), wide area networks (WANs), local area networks (LANs), or personal area networks (PANs). In addition, the one or more networks 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The randomized file segmentation and storage subsystem 220 may be configured to communicate with the computer device 210, the one or more virtual machines 255, and the remote devices 265. The randomized file segmentation and storage subsystem 220 may be any type of computing devices, such as, but not limited to, mobile, desktop, and/or cloud computing devices, such as servers. The randomized file segmentation and storage subsystem 220 may include one or more servers, perhaps arranged in a cluster, as a server farm, or as individual servers not associated with one another.

The randomized file segmentation and storage subsystem 220 may include at least a memory 250 and one or more processing units (or processors) 222. The processors 222 may be implemented as appropriate in hardware, software, firmware, or combinations thereof. Software or firmware implementations of the processors 222 may include computer-executable or machine-executable instructions written in any suitable programming language to perform the various functions described.

The memory 250 may store program instructions that are loadable and executable on the processors 222, as well as data generated during the execution of these programs. Depending on the configuration and type of the randomized file segmentation and storage subsystem 220, the memory 250 may be volatile (such as random access memory (RAM)) and/or non-volatile (such as read-only memory (ROM), flash memory, etc.). The randomized file segmentation and storage subsystem 220 may also include additional removable storage 248 and/or non-removable storage 252 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 250 may include multiple different types of memory, such as static random access memory (SRAM), dynamic random access memory (DRAM), or ROM.

The memory 250, the removable storage 248, and the non-removable storage 252 may be all examples of computer-readable storage media. For example, computer-readable storage media may include volatile and non-volatile, removable and non-removable media implemented in any method or technology for the storage of information such as computer-readable instructions, data structures, program modules, or other data. The memory 250, the removable storage 248, and the non-removable storage 252 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the randomized file segmentation and storage subsystem 220 or other computing devices. Combinations of the any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The randomized file segmentation and storage subsystem 220 may also contain communication connection(s) (not shown in FIG. 2) that allow the randomized file segmentation and storage subsystem 220 to communicate with a stored database, another computing device or server, user terminals, and/or other devices on a network. The randomized file segmentation and storage subsystem 220 may also include input device(s) 244 such as a keyboard, a mouse, a pen, a voice input device, a touch input device, etc., and output device(s) 246, such as a display, speakers, printers, etc.

Turning to the contents of the memory 250 in more detail, the memory 250 may include an operating system (not shown in FIG. 2) and one or more application programs or services for implementing the features disclosed herein, including a file splitter 254, multiple servers 260, and a file assembler 256. In some instances, the file splitter 254, the multiple servers 260, and the file assembler 256 may receive, transmit, and/or store information in one or more databases of the randomized file segmentation and storage subsystem 220.

The file splitter 254 including computer-executable instructions, code, or the like that responsive to execution by one or more of the processor(s) 222 may perform functions including, but not limited to, perfuming the operation 152 as described in FIG. 1. For example, the file splitter 254 may receive a data file 214 (e.g., the data file 120 of FIG. 1) from the computer device 210 when the physical key 212 is plugged into the computer device 210. The file splitter 254 may separate the data file 214 into multiple file fragments 258(1)-258(N). In some embodiments, the file splitter 254 may generate tokens to encrypt the file fragments 258(1)-258(N), as further described in FIG. 3. The file splitter 254 may send the file fragments 258(1)-258(N) to the multiple servers 260(1)-260(N). In some embodiments, the file splitter 254 may include one or more computing devices and/or servers.

The multiple servers 260(1)-260(N) may perform the operations 154 and 156 as described in FIG. 1. For example, each of the file fragments 258(1)-258(N) may be sent to a randomly selected server of the multiple servers 260(1)-260(N). The randomly selected server may encrypt the received file fragment to generate encrypted fragments 266(1)-266(N). Each server (e.g., 260(1), . . . , 260(N)) may include a token generator (e.g., 262(1), . . . , 262(N)), a database, and a timer (e.g., 264(1), . . . , 264(N)). The token generator of each server may generate a unique token having a random expiration time for a received file fragment. The data store may store the generated token until reaching the random expiration time. The timer may calculate remaining time to reach the random expiration time for the token, and indicating whether or not the token is expired. In some embodiments, the multiple servers 260(1)-260(N) may be external to the randomized file segmentation and storage subsystem 220. The randomized file segmentation and storage subsystem 220 may generate instructions to instruct each of the multiple servers 260(1)-260(N) to generate encrypted fragments 266(1)-266(N). For example, the randomized file segmentation and storage subsystem 220 may instruct each of the multiple servers 260(1)-260(N) to generate a token having a random expiration time and to assign the generated token to a corresponding received file fragment.

The file assembler 256 including computer-executable instructions, code, or the like that responsive to execution by one or more of the processor(s) 222 may perform functions including, but not limited to, perfuming the operations 158 and 160 as described in FIG. 1. For example, the file assembler 256 may receive a request 216 from the computer device 210. The file assembler 256 may retrieve the encrypted fragments 266(1)-266(N) associated with a timestamp of the request. The file assembler 256 may reassemble the retrieved fragments 266(1)-266(N) to form a reassembled data file 218, and send the reassembled data file 218 to the computer device 210, the one or more virtual machines 255, and/or the remote devices 265. In some embodiments, the reassemble data file 218 may the same as the data file 214. In some embodiments, the file splitter 254 may include one or more computing devices and/or servers.

FIG. 3 is a schematic illustration of an example data management system 300 in accordance with one or more example embodiments of the disclosure. A physical key 312 (e.g., the physical keys 112 and 212 in FIG. 1 and FIG. 2)

may be plugged into a computer device 310 (e.g., the computer devices 110 and 210 in FIG. 1 and FIG. 2). The computer device 310 may be an approved/authorized computer device that may have the only access to call data pools from the randomized file segmentation and storage subsystem 330 (e.g., randomized file segmentation and storage subsystem 220 of FIG. 2) to assign secured segments to appropriate departments in accordance with their business of a corporation or the government. Until the data is called and segmented by the approved computer device 310, the data remains being transferred among multiple servers 348a-348d in constant motion. The approved computer device 310 will never leave the local business site and will be biometrically encoded to an authorized user utilizing a triple-Bio approach (e.g., recognition of fingerprints, retina and voice). The physical key 312 may remain onsite (e.g. may never leave the corporation or the government), which may prevent theft, loss and damage. The physical key 312 may be a hardware appliance that may be independent from an operating system (OS) type. In some embodiments, the physical key 312 may include a feature of an end-to-end encryption that may secure communication that prevents third-parties from accessing data while the data transferred from one end system or device to another by applying encryption to the data on one device such that only the device to which it is sent can decrypt the data.

The approved computer device 310 may send a data file 336 to a file splitter 332 (e.g., the file splitter 254 in FIG. 2) that may separate the data file 336 into file fragments 338a-338c. For example, all files saved while utilizing an internal network of the corporation or the government may pass through the file splitter 332. The files may be split into a random number of file fragments having random sizes. The file splitter 332 may include an encryptor 340 to encrypt the file fragments 338a-338c. For example, the encryptor 340 may generate a unique token (e.g., 342a, 342b, or 342c) for each of the file fragments 338a-338c. Each file fragment may be encrypted using 4096 bit encryption. The encrypted file fragments may be stored at a file storage 344 for further use and/or processing. The encrypted file fragments may be also sent to servers 348a-348d (e.g., the servers 260(1)-(260(N) in FIG. 2) instructed by the processors 334 (e.g., the processors 222 in FIG. 2). Each of the servers 348a-348d may generate a unique token (e.g., 346a, 346b, 346c, or 346d) upon receiving a file fragment, and then may assign the unique token to the received file fragment. An example token may be a 4096 bit encrypted token. The file fragments 338a-338c may constantly pass from one server to the next server until requested by the approved computer device 310 and/or remote devices (e.g., 316 and 318). In some embodiments, the methods performed on the randomized file segmentation and storage subsystem 330 may be utilized as middle ware that is a computer software appliance or computer software that provides services to hardware and applications beyond those provided solely by an operating system (OS). For example, the methods performed on the randomized file segmentation and storage subsystem 330 may be deployed as a software based middle ware appliance or software only release (i.e., an ISO file) either way the impact is the same, meaning the integrity of the product is not compromised. The middle ware approach may allow for easier implementation for input/output/monitoring purposes. Middle ware will facilitate and support any and all current standards of physical control mechanisms.

A virtual machine 314 (e.g., the virtual machines in FIG. 2) may communicate with the approved computer device 310, and/or remote devices (e.g., 316 and 318) via a VPN gateway 320 (e.g., the VPN gateway 240 in FIG. 2). The remote devices may store data on the randomized file segmentation and storage subsystem 330 via the VPN gateway 320, and receive segmented data via the virtual machine 314 so that the data will never leave authorized premises. Remote workforce may possess biometric token generators to access a layer of a company network. The biometric token generator will ensure that no one except an authorized user may generate a token to access the randomized file segmentation and storage subsystem 330 remotely.

Figure 4:
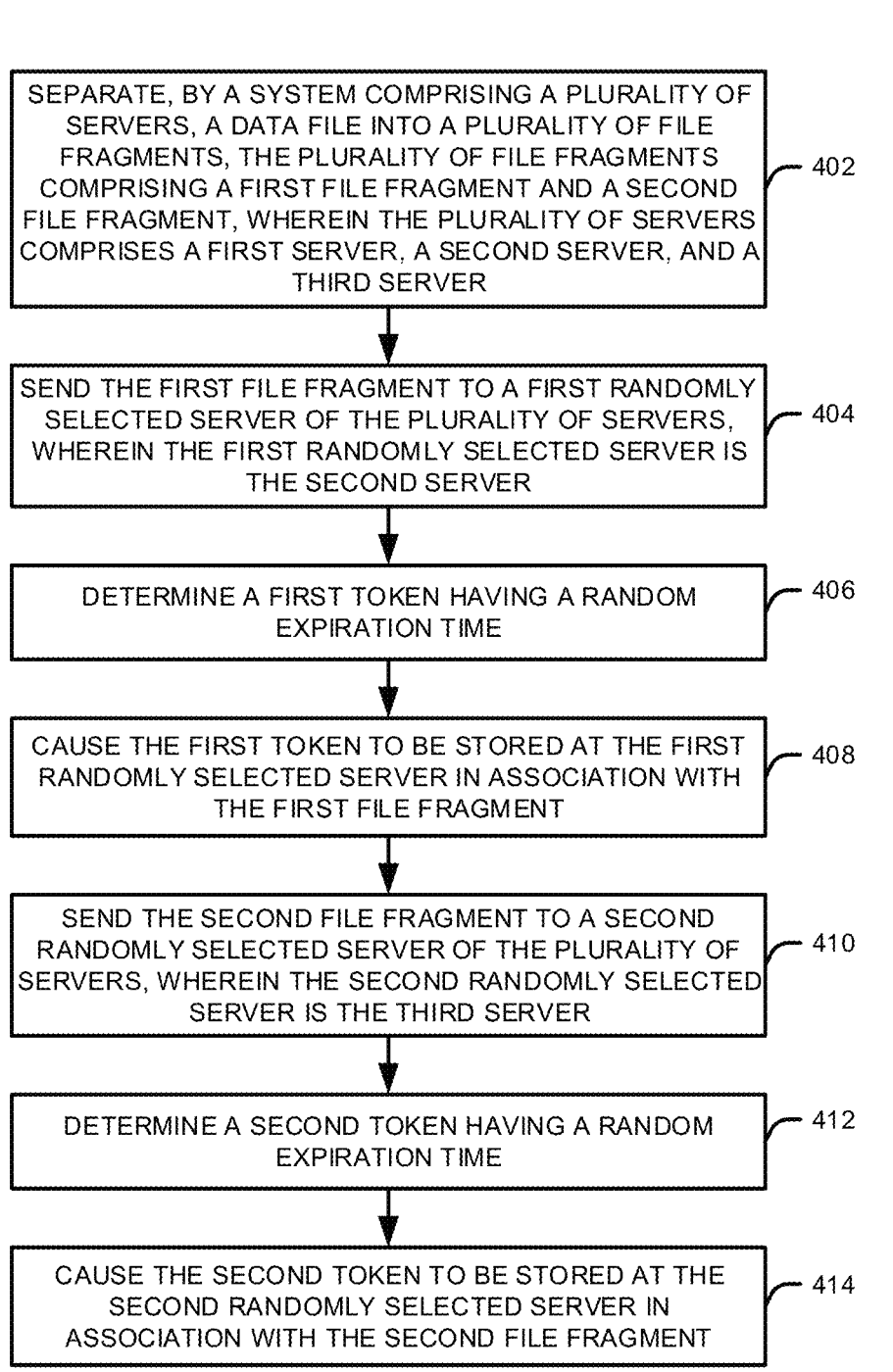
FIG. 4 is an example process flow diagram of an illustrative method for randomized file segmentation and storage in accordance with one or more example embodiments of the disclosure.

FIG. 4 is an example process flow diagram of an illustrative method 400 for randomized file segmentation and storage in accordance with one or more example embodiments of the disclosure. In FIG. 4, computer-executable instructions of one or more module(s) (e.g., the randomized file segmentation and storage subsystem 150/220/330) of the data management system 100/200/300 may be executed to perform randomized file segmentation and storage.

At block 402 of the method 400 in FIG. 4, the method includes separating, by a system comprising a plurality of servers, a data file into a plurality of file fragments, the plurality of file fragments comprising a first file fragment and a second file fragment, wherein the plurality of servers comprises a first server, a second server, and a third server. For instance, the file splitter may separate a data file into a plurality of file fragments. Examples are described with respect to FIGS. 1-3.

Block 404 of the method 400 includes sending the first file fragment to a first randomly selected server of the plurality of servers, wherein the first randomly selected server is the second server. For example, the file splitter may send file fragments to randomly selected servers. Examples are described with respect to FIGS. 1-3.

Block 406 of the method 400 includes determining a first token having a random expiration time. For example, a server that receives a file fragment may generate a unique token having a random expiration time for the received file fragment. Examples are described with respect to FIGS. 1-3.

Block 408 of the method 400 includes causing the first token to be stored at the first randomly selected server in association with the first file fragment. For example, the server may cause the unique token for the received file fragment to be stored at a data store of the server until a timer of the server indicative of the random expiration time is reached. Examples are described with respect to FIGS. 1-3.

Block 410 of the method 400 includes sending the second file fragment to a second randomly selected server of the plurality of servers, wherein the second randomly selected server is the third server. Examples are described with respect to FIGS. 1-3.

Block 412 of the method 400 includes determining a second token having a random expiration time. Examples are described with respect to FIGS. 1-3.

Block 414 of the method 400 includes causing the second token to be stored at the second randomly selected server in association with the second file fragment. Examples are described with respect to FIGS. 1-3.

The operations described and depicted in the illustrative process flow of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

One or more operations of the process flow of FIG. 4 may have been described above as being performed by a user device, or more specifically, by one or more program modules, applications, or the like executing on a device. It should be appreciated, however, that any of the operations of process flow of FIG. 4 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flow of FIG. 4 may be described in the context of the illustrative the object tracking system, it should be appreciated that such operations may be implemented in connection with numerous other device configurations.

It should further be appreciated that the randomized file segmentation and storage subsystem 150/220/330 may include alternate and/or additional hardware, software, or firmware components beyond those described or depicted without departing from the scope of the disclosure. More particularly, it should be appreciated that software, firmware, or hardware components depicted as forming part of the randomized file segmentation and storage subsystem 150/220/330 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 5:
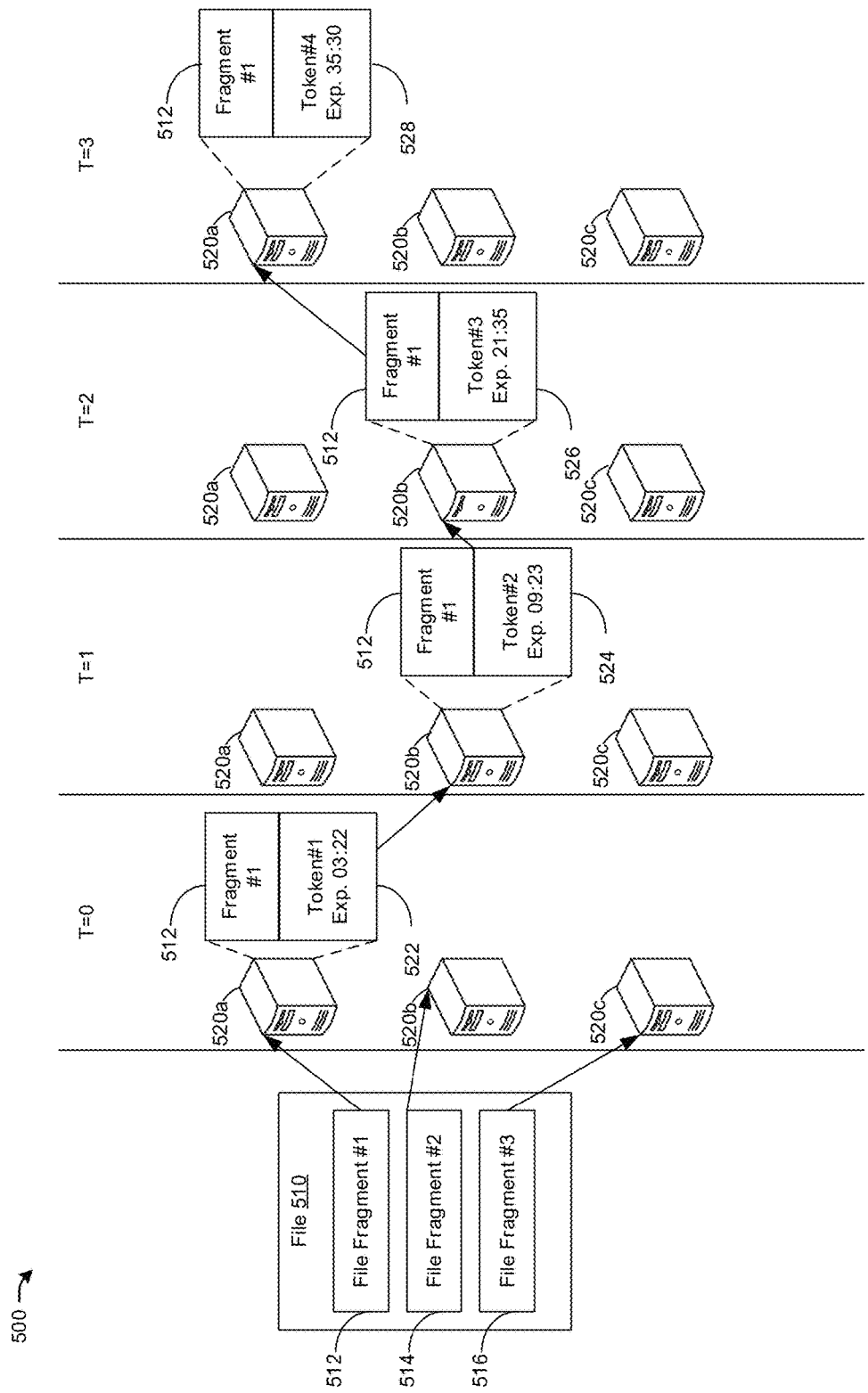
FIG. 5 is a schematic illustration of an example use case illustrating randomized file segmentation and storage in accordance with one or more example embodiments of the disclosure.

FIG. 5 is a schematic illustration of an example use case 500 illustrating randomized file segmentation and storage in accordance with one or more example embodiments of the disclosure.

As shown in FIG. 5, a data file 510 may be separated into file fragments 512-514 that may be different in size. Each of the file fragments 512-514 may be sent to a randomly selected server of servers 520a, 520b, and 520c. Taking the file fragment 512 as one example, the file fragment 512 may be sent to the server 520a that is randomly selected at a time point T=0, T representing a different point in time, but not a time interval. The server 520a may generate a token 522 having a first random expiration time 3:23. The server 520a may attach the token 522 to the file fragment 512, and store the file fragment 512 attached by the token 522 in a database of the server 520a. The file fragment 512 with the token 522 may be stored until the token 522 is expired. After the token 522 is expired, the file fragment 512 may be sent to the server 520b that is randomly selected. The server 520b may generate a token 524 having a second random expiration time 09:23. The server 520b may attach the token 524 to the file fragment 512, and store the file fragment 512 attached by the token 524 in a database of the server 520b. After the token 524 is expired, the file fragment 512 may be sent to the server 520b again that is randomly selected. The server 520b may generate a token 526 having a third random expiration time 21:35. The token 526 may be different from the token 524, even if those tokens are generated by the same server for the same file fragment. The server 520b may attach the token 526 to the file fragment 512, and store the file fragment 512 attached by the token 526 in the database of the server 520b. After the token 526 is expired, the file fragment 512 may be sent to the server 520a again that is randomly selected. The server 520a may generate a token 528 having a fourth random expiration time 35:30. The token 528 may be different from any of the previous tokens 522, 524, and 526. The server 520a may attach the token 528 to the file fragment 512, and store the file fragment 512 attached by the token 528 in the database of the server 520b. After the token 524 is expired, the file fragment 512 may be sent to another randomly selected server. The above process may be repeated for the file fragment 512 until a request to access the data file 510 may be received from an approved computer device (e.g., the computer devices 110/210 in FIG. 1 and FIG. 2) Similarly, the file fragments 514 and 516 may be sent from one randomly selected server to another randomly selected server. All of the file fragments 512-514 will rotate among the servers 520a-520c, but never reside on the same server at one time. For each time point T, a single server of the servers 520a-520c may store at most one file fragment. Any two of the file fragments 512-514 will not be stored at the same server at the same time.

Figure 6:
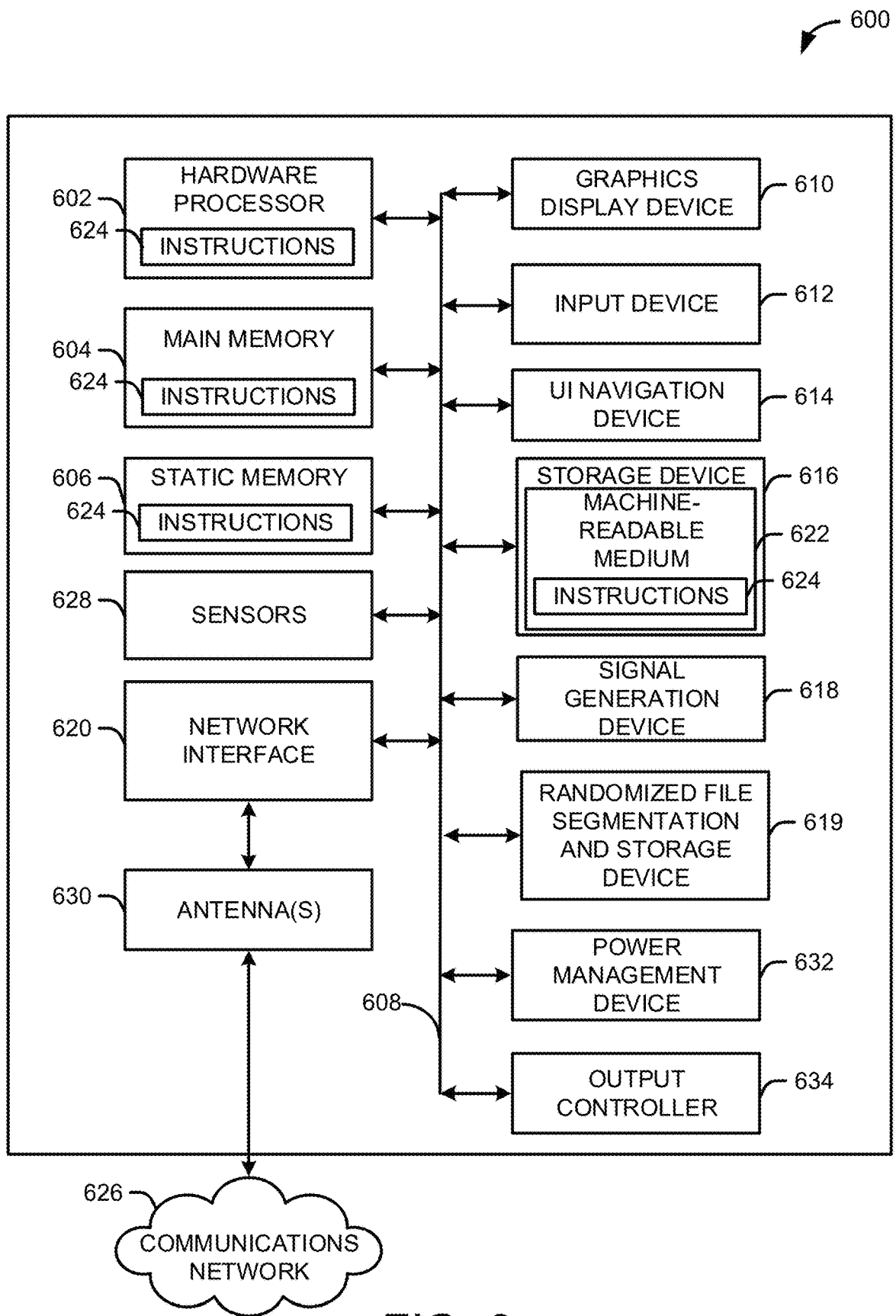
FIG. 6 illustrates a block diagram of an example of a machine, in accordance with one or more example embodiments of the present disclosure.

FIG. 6 illustrates a block diagram of an example of a machine 600 (e.g., the randomized file segmentation and storage subsystem 150/220/330) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an input device 612 (e.g., a keyboard), and a user interface (UI) navigation device 614 (e.g., a mouse). In an example, the graphics display device 610, input device 612, and UI navigation device 614 may be a touch screen display. The machine 600 may additionally include a storage device (i.e., drive unit) 616, a signal generation device 618 (e.g., an emitter, a speaker), a randomized file segmentation and storage device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The randomized file segmentation and storage device 619 may carry out or perform any of the operations and processes (e.g., process 400 of FIG. 4) described above. The randomized file segmentation and storage device 619 may be one embodiment of the randomized file segmentation and storage subsystem 150/220/330. For example, the randomized file segmentation and storage device 619 may include at least the file splitter 254, the file assembler 256, and/or multiple servers 260.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass.

Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

That which is claimed is:

1. A method comprising:
separating, by a system comprising a plurality of servers, a data file into a plurality of file fragments, the plurality of file fragments comprising a first file fragment and a second file fragment, wherein the plurality of servers comprises a first server, a second server, and a third server;
sending the first file fragment to a first randomly selected server of the plurality of servers, wherein the first randomly selected server is the second server;
determining a first token having a random expiration time;

causing the first token to be stored at the first randomly selected server in association with the first file fragment;

sending the second file fragment to a second randomly selected server of the plurality of servers, wherein the second randomly selected server is the third server;

determining a second token having a random expiration time; and causing the second token to be stored at the second randomly selected server in association with the second file fragment, wherein the first randomly selected server is configured to send the first file fragment to a third randomly selected server of the plurality of servers after expiration of the first token, and the second randomly selected server is configured to send the second file fragment to a fourth randomly selected server of the plurality of servers after expiration of the second token.

2. The method of claim 1, further comprising:
receiving a request to access the data file;
determining that the request is associated with an approved computer device;
determining that the request is authenticated via a physical key coupled to the approved computer device;
determining a current server storage location of the first file fragment and the second file fragment; and
causing servers associated with the respective current server storage locations to send the first file fragment and the second file fragment to the approved computer device.

3. The method of claim 2, further comprising:
reassembling the first file fragment and the second file fragment to form the data file.

4. The method of claim 2, wherein the approved computer device is associated with one or more remote devices, or one or more virtual machines, the method further comprising providing access to the data file to the one or more remote devices or the one or more virtual machines.

5. The method of claim 2, wherein the plurality of file fragments is a first plurality of file fragments, the method further comprising:
determining that the physical key is removed from the approved computer device;
revoking access to the data file;
separating the data file into a second plurality of file fragments;
sending a file fragment of the second plurality of file fragments to a randomly selected server of the plurality of servers;
determining a third token having a random expiration time; and
causing the third token to be stored at the randomly selected server in association with the file fragment.

6. The method of claim 1, further comprising:
cause the first randomly selected server to send the first file fragment to the third randomly selected server of the plurality of servers after expiration of the first token, wherein the third randomly selected server is the first server;
determining a third token having a random expiration time, wherein the first token and the third token are different; and
causing the third token to be stored at the third randomly selected server in association with the first file fragment, wherein the third randomly selected server is configured to send the first file fragment to a fifth randomly selected server of the plurality of servers after expiration of the third token.

7. The method of claim 6, wherein the first token is replaced by the third token, and wherein the first randomly selected server, the third randomly selected server, and the fifth randomly selected server are different.

8. The method of claim 6, further comprising:
causing the second randomly selected server to send the second file fragment to the fourth randomly selected server of the plurality of servers after expiration of the second token, wherein the fourth randomly selected server is the second server; and
determining a fourth token having a random expiration time, wherein the first token, the second token and the fourth token are different,
wherein the fourth randomly selected server is configured to send the second file fragment to a sixth randomly selected server of the plurality of servers after expiration of the fourth token.

9. The method of claim 1, wherein the number of the plurality of file fragments is random, and wherein at least two of the plurality of file fragments are different in size.

10. The method of claim 1, wherein the first token is determined by the first randomly selected server based at least in part on the first randomly selected server receiving the first file fragment; and wherein the second token is determined by the second randomly selected server based at least in part on the second randomly selected server receiving the second file fragment.

11. A system comprising:
a plurality of servers comprising a first server, a second server, and a third server;
a memory coupled to at least one processor, the at least one processor configured to:
separate a data file into a plurality of file fragments, the plurality of file fragments comprising a first file fragment and a second file fragment;
send the first file fragment to a first randomly selected server of the plurality of servers, wherein the first randomly selected server is the second server;
determine a first token having a random expiration time;
cause the first token to be stored at the first randomly selected server in association with the first file fragment;
send the second file fragment to a second randomly selected server of the plurality of servers, wherein the second randomly selected server is the third server;
determine a second token having a random expiration time; and
cause the second token to be stored at the second randomly selected server in association with the second file fragment,
wherein the first randomly selected server is configured to send the first file fragment to a third randomly selected server of the plurality of servers after expiration of the first token, and the second randomly selected server is configured to send the second file fragment to a fourth randomly selected server of the plurality of servers after expiration of the second token.

12. The system of claim 11, wherein the at least one processor is further configured to:
receive a request to access the data file;

determine that the request is associated with an approved computer device;

determine that the request is authenticated via a physical key coupled to the approved computer device;

determine a current server storage location of the first file fragment and the second file fragment; and cause servers associated with the respective current server storage locations to send the first file fragment and the second file fragment to the approved computer device.

13. The system of claim 12, wherein the at least one processor is further configured to:

reassemble the first file fragment and the second file fragment to form the data file.

14. The system of claim 12, wherein the approved computer device is associated with one or more remote devices, or one or more virtual machines, wherein the at least one processor is further configured to provide access to the data file to the one or more remote devices or the one or more virtual machines.

15. The system of claim 12, wherein the plurality of file fragments is a first plurality of file fragments, wherein the at least one processor is further configured to:

determine that the physical key is removed from the approved computer device;

revoke access to the data file;

separate the data file into a second plurality of file fragments;

send a file fragment of the second plurality of file fragments to a randomly selected server of the plurality of servers;

determine a third token having a random expiration time; and cause the third token to be stored at the randomly selected server in association with the file fragment.

16. The system of claim 11, wherein the at least one processor is further configured to:

cause the first randomly selected server to send the first file fragment to the third randomly selected server of the plurality of servers after expiration of the first token, wherein the third randomly selected server is the first server;

determine a third token having a random expiration time, wherein the first token and the third token are different; and cause the third token to be stored at the third randomly selected server in association with the first file fragment, wherein the third randomly selected server is configured to send the first file fragment to a fifth randomly selected server of the plurality of servers after expiration of the third token.

17. The system of claim 16, wherein the first token is replaced by the third token, and wherein the first randomly selected server, the third randomly selected server, and the fifth randomly selected server are different.

18. The system of claim 16, wherein the at least one processor is further configured to:

cause the second randomly selected server to send the second file fragment to the fourth randomly selected server of the plurality of servers after expiration of the second token, wherein the fourth randomly selected server is the second server; and determine a fourth token having a random expiration time, wherein the first token, the second token and the fourth token are different, wherein the fourth randomly selected server is configured to send the second file fragment to a sixth randomly selected server of the plurality of servers after expiration of the fourth token.

19. The system of claim 11, wherein the number of the plurality of file fragments is random, and wherein at least two of the plurality of file fragments are different in size.

20. The system of claim 11, wherein the first token is determined by the first randomly selected server based at least in part on the first randomly selected server receiving the first file fragment; and wherein the second token is determined by the second randomly selected server based at least in part on the second randomly selected server receiving the second file fragment.

* * * * *